US007155591B2

(12) United States Patent
Ripley et al.

(10) Patent No.: US 7,155,591 B2
(45) Date of Patent: *Dec. 26, 2006

(54) VERIFYING THE INTEGRITY OF A MEDIA KEY BLOCK BY STORING VALIDATION DATA IN THE VALIDATION AREA OF MEDIA

(75) Inventors: Micheal S. Ripley, Hillsboro, OR (US); Jeffrey B. Lotspiech, San Jose, CA (US); Atsushi Ishihara, Aoba-ku (JP); Taku Kato, Kamakura (JP); Yoshihisa Fukushima, Osaka (JP)

(73) Assignee: Intel Corporation, Santa Clara, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/829,312

(22) Filed: Apr. 20, 2004

(65) Prior Publication Data

US 2004/0205315 A1   Oct. 14, 2004

Related U.S. Application Data

(63) Continuation of application No. 09/973,547, filed on Oct. 9, 2001, now Pat. No. 6,912,634, which is a continuation-in-part of application No. 09/823,718, filed on Mar. 30, 2001, now Pat. No. 6,738,878, which is a continuation-in-part of application No. 09/750,642, filed on Dec. 28, 2000.

(51) Int. Cl.
G06F 12/14 (2006.01)

(52) U.S. Cl. .................................. 711/164; 713/193

(58) Field of Classification Search .................... None
See application file for complete search history.

(56) References Cited

U.S. PATENT DOCUMENTS

| 5,883,958 | A | 3/1999 | Ishiguro et al. |
| 5,915,018 | A | 6/1999 | Aucsmith |
| 6,161,179 | A | 12/2000 | Seidel |
| 6,550,009 | B1 | 4/2003 | Uranaka et al. |
| 2004/0156503 | A1* | 8/2004 | Bell et al. ................. 380/44 |

FOREIGN PATENT DOCUMENTS

| EP | 0 984 946 | 3/2000 |
| WO | WO 01/95327 | 12/2001 |

OTHER PUBLICATIONS

XP-002167964, "Content Protection for Recordable Media Specification, DVD Book, Revision 0.94", Intel Corporation et al., Oct. 18, 2000.*

"Content Protection For Recordable Media Specification", Introduction and Common Cryptographic Elements, Intel Corporation; International Business Machines Corp.; Matsushita Electric Industrial Co. Ltd.; Toshiba Corporation, Revision 0.94, Oct. 18, 2000.

(Continued)

*Primary Examiner*—Gary Portka
(74) *Attorney, Agent, or Firm*—Libby H. Hope

(57) ABSTRACT

A method for verifying the integrity of a media key block (MKB) by storing validation data in a validation area of a medium, such as a DVD-R or a DVD-RW. In one embodiment, validation data comprises a hash function on a media key block. In another embodiment, validation data comprises the Verification Data field of an MKB's Verify Media Key Record.

11 Claims, 9 Drawing Sheets

OTHER PUBLICATIONS

"Content Protection System Architecture", A Comprehensive Framework for Content Protection, Intel Corporation; International Business Machines Corp.; Matsushita Electric Industrial Co. Ltd.; Toshiba Corporation, Revision 0.81, Feb. 17, 2000.

"C2 Block Cipher Specification", Intel Corporation; International Business Machines Corp.; Matsushita Electric Industrial Co. Ltd.; Toshiba Corporation, Revision 0.9, Jan. 11, 2000.

* cited by examiner

VERIFYING THE INTEGRITY OF A MEDIA KEY BLOCK BY STORING VALIDATION DATA IN THE VALIDATION AREA OF MEDIA

This application is a continuation of U.S. Pat. No. 6,912,634 (U.S. patent application Ser. No. 09/973,547), filed Oct. 9, 2001, issued Jun. 28, 2005, entitled "VERIFYING THE INTEGRITY OF A MEDIA KEY BLOCK BY STORING VALIDATION DATA IN A VALIDATION AREA OF MEDIA", which is a continuation-in-part of U.S. Pat. No. 6,738,878 (U.S. patent application, Ser. No. 09/823,718), filed Mar. 30, 2001, issued May 18, 2004, entitled "VERIFYING THE INTEGRITY OF A MEDIA KEY BLOCK BY STORING VALIDATION DATA IN THE CUTTING AREA OF MEDIA", which is a continuation in part of presently co-pending U.S. patent application Ser. No. 09/750,642 filed on Dec. 28, 2000, entitled "METHOD AND APPARATUS FOR VERIFYING THE INTEGRITY OF A MEDIA KEY BLOCK".

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD

This invention relates to static and dynamic information storage and retrieval. More particularly, this invention relates to methods, apparatus and systems for the protection of stored information from unauthorized access.

BACKGROUND

Information or content may be stored on a wide variety of media. As the speed and convenience of accessing and copying stored information have increased, the threat of unauthorized copying of the information has increased correspondingly. Various schemes have been employed to protect the stored information from unauthorized access. For instance, the content stored on the media may be encrypted with a secret key, or keys, known only to devices authorized to access the media. A disadvantage of only one key is the inability to revoke the authorization of a particular device, by changing the key, without revoking the authority of all devices to read the media. Some of the disadvantages of using multiple keys include the potentially large burden of transmitting and storing the keys for each particular device.

An alternative method developed to protect content from unauthorized copying uses a media key block (MKB) to authorize copying of the content, as described by a publication from 4C Entity, LLC, entitled "CONTENT PROTECTION FOR RECORDABLE MEDIA SPECIFICATION," Revision 0.94 (Oct. 18, 2000). Authorized devices process the MKB to calculate, as described in part below, a media key allowing an authorized device to copy the content. The MKB method uses a media unique key to bind encrypted content to the media from which it will be played back.

As keys are compromised and revoked, the MKB can become quite large, with a size of several megabytes not being unusual. Since many types of media have limited read-only space, it becomes necessary to store the MKB on writeable areas of the media. Storing the MKB on the writeable area creates a vulnerability of the MKB to direct malicious tampering. In such a direct attack, the intent of the tamperer will likely be to substitute an older MKB for the current MKB stored on the media. In the alternative, the tamperer may substitute a portion of an older MKB for a portion of the current MKB stored on the media. Since the older MKB will still contain keys that are revoked by the current MKB, the substitution will potentially compromise the content protection provided by the current MKB.

Even if the MKB is stored on the read-only area of the media, another weakness of the MKB approach is the ability for a man-in-the-middle attack to substitute an older MKB for the current MKB during the attempted processing of the current MKB. In the alternative, the man-in-the-middle attacker may substitute a portion of an older MKB for a portion of the current MKB during the attempted processing of the current MKB. Thus, a man-in-the-middle attack also potentially compromises the content protection provided by the current MKB.

Thus, media without a valid MKB could be read and readers without authorization could read content stored on protected media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
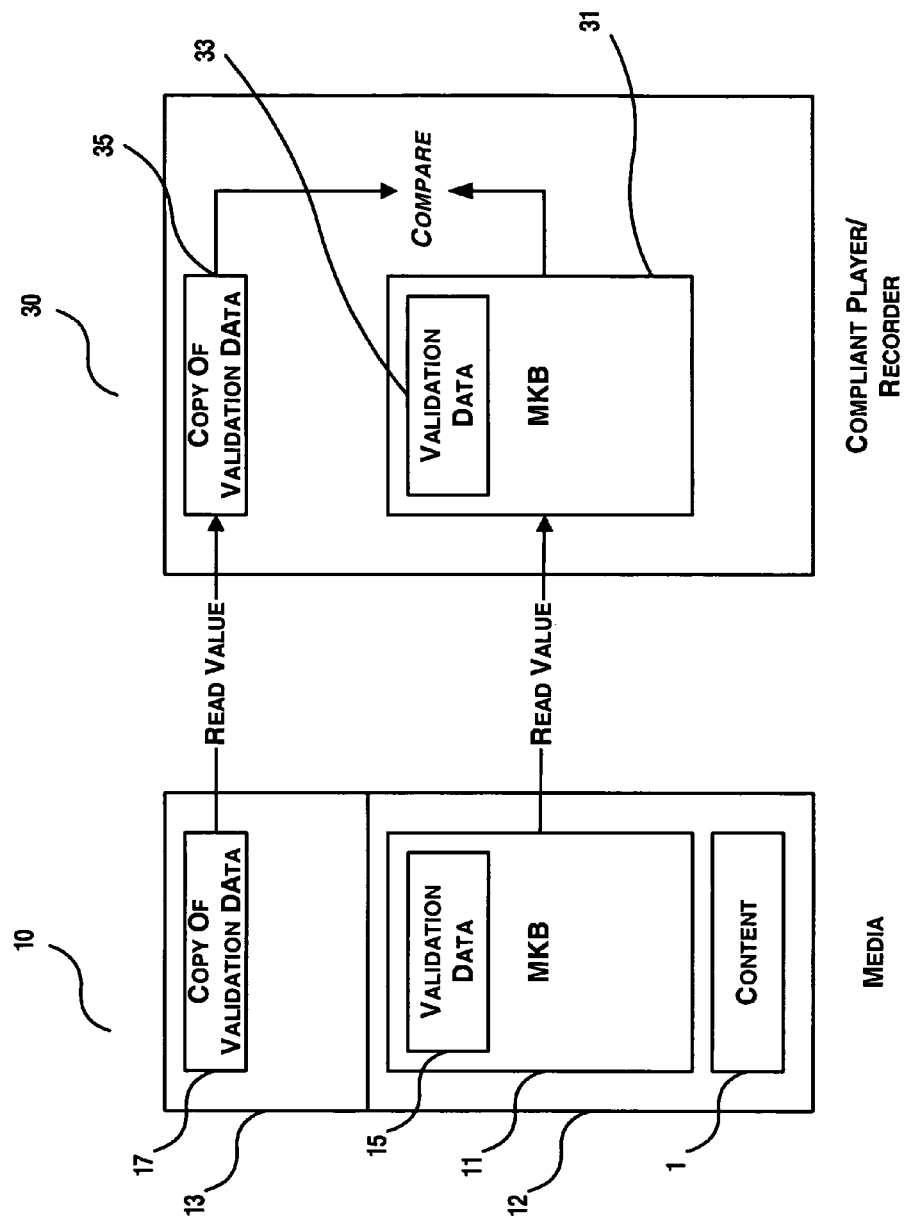
FIG. 1 is a simplified block diagram of an embodiment of the present invention.

In one aspect of the invention, a method for verifying the integrity of a media key block (MKB) by storing validation data in a validation area of a medium, such as a DVD-R or a DVD-RW, is disclosed.

In one embodiment, validation data may comprise a hash function on a media key block (MKB) to achieve compatibility with DVD-RAMs when the MKB is being verified in a drive-host configuration. In this embodiment, the drive reads the MKB from the control data area (CDA) of a disc, whether it is a DVD-RAM, a DVD-R, or a DVD-RW. A minor adjustment to the drive allows the drive to read the hash value from the CDA of a DVD-RAM or a narrow burst cutting area (NBCA) of a DVD-R or a DVD-RW, thus allowing the host to verify the authenticity of the MKB using previously established procedures.

In another embodiment, validation data may comprise a Verification Data field of an MKB's Verify Media Key Record to achieve simplified operation when the MKB is being verified by a consumer electronics player/recorder (hereinafter a "CE device"). In this embodiment, a CE device reads the MKB from the CDA of a disc. A minor adjustment to the device allows it to read the Verification Data field from the CDA of a DVD-RAM or a narrow burst cutting area (NBCA) of a DVD-R or a DVD-RW, thus allowing the device to verify the authenticity of the MKB using previously established procedures.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read-only Memories), and magneto-optical disks, ROMs (Read-only Memories), RAMs (Random Access Memories), EPROMs (Erasable Programmable Read-only Memories), EEPROMs (Electromagnetic Erasable Programmable Read-only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Introduction

Herein, certain terminology is used to discuss features of the present invention. For example, content is information programmed by owners or licensees, such as broadcast or cable networks. "Content" can by any form of audible or visual information including business data, news, sports, artistic performances, entertainment, advertising, documentaries, talk, films, videos, cartoons, text, music and graphics.

Media

Media includes any mechanism that provides (i.e., stores and/or transmits) content in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); etc. Typically, content may be stored in encrypted form on media such as DVDs (Digital Versatile Discs), CDs, floppy discs, flash memory arrays. Access control comes from the inability of an unauthorized device, or a device having revoked keys, to successfully process the MKB, validate the MKB and then decrypt the content. In embodiments of the invention, concepts are described with respect to DVD-RAM, DVD-R, and DVD-R/W. However, where applicable, these concepts may apply to media, in general.

Media Reader

A media reader is an electronic device that reads the content from the media. A media reader may also read data other than the content from the media. For instance, media reader may be a DVD drive or player, a CD drive or player, a floppy drive, a digital television, a digital VCR, a CPU of a personal computer, a processor or a circuit coupled to flash memory cells, or any other consumer electronics device capable of accessing content stored on the media. Devices which also write or record to the media, such as CD-RW drives, are also considered media readers.

Content Protection For Recordable Media (CPRM)

In embodiments of the invention, media readers may implement Content Protection for Recordable Media (CPRM) format for protecting content. CPRM defines a method for protecting content stored on a number of physical media types, including, but not limited to, DVD-RAM, DVD-R, and DVD-RW. The device requirements are explained in further detail in the section below entitled "Media Key Block".

Media Key Block

An MKB is formatted as a sequence of contiguous records, where each record begins with a record type field, followed by a record length field. An MKB is part of an MKB Frame that is constructed from n MKB Packs having data. Each MKB Frame begins with an MKB Descriptor, which is part of the first MKB Pack, or MKB Pack #0. Each of the first n−1 MKB Packs are filled completely. The nth MKB Pack may end up with unused bytes, which are zero-filled.

In order to process the MKB, each authorized device receives a set of "n" device keys. The "n" device keys are referred to as $Kd\_i$ (i=0,1, . . . ,n−1). For each device key there is an associated column and row value in the MKB, referred to as column value ($Cd\_i$ for i=0,1, . . . ,n−1) and row value ($Rd\_i$ for i=0,1, . . . ,n−1), respectively. An authorized device will have at most one device key for each column of the MKB, although, an authorized device may have more than one device key per row.

The device keys and associated row and column values are kept secret. If a set of device keys is compromised, an updated MKB can be released that causes a device with the compromised set of device keys to calculate a different media key than is computed by the remaining compliant devices. In this way, the compromised device keys are "revoked" by the new MKB.

Using its device keys, a device calculates the media key by processing records of the MKB one-by-one from first to last. After processing of the MKB is completed, the device uses the most recently calculated media key value as the final value for the media key. If a device correctly processes an MKB using device keys that are revoked by that MKB, the resulting final media key will have the special value 0H, where H designates a hexadecimal number. This special value will never be an MKB's correct final media key value, and can therefore always be taken as an indication that the device's keys are revoked. If a device calculates this special media key value, it stops the authentication, playback, or recording session in progress, and will not use that media key value in any subsequent calculations.

A properly formatted MKB will have exactly one Verify Media Key Record (VMKR) as its first record. The VMKR contains the hexadecimal value DEADBEEF encrypted with the correct, final media key. The presence of the VMKR is mandatory, but the use of the VMKR by a device is not mandatory. A device may attempt to decrypt the VMKR using its current media key value during the processing of subsequent Records, checking each time for the hexadecimal value DEADBEEF. If the device successfully decrypts the VMKR, the device has already calculated the correct final media key value, and may therefore stop processing the MKB.

A properly formatted MKB will have exactly one calculate media key record (CMKR). Devices must ignore any CMKRs encountered after the first one in an MKB. The CMKR includes a column field. The column field indicates the associated column value for the device key to be used with this record, as described below. The CMKR also contains encrypted key data in each column corresponding to each of the device key rows. Before processing the CMKR, the device checks that the device has a device key with associated column value $Cd\_i == column$, for some i.

If the device does not have a device key with the associated column value, the device ignores the rest of the CMKR. Otherwise, using the value i from the condition above, the device key and $r=Rd\_i$, $c=Cd\_i$, the device decrypts a media key value from the encrypted key data for row $r=Rd\_i$. The resulting media key value becomes the current media key value.

A properly formatted MKB may have zero or more conditionally calculate media key records (C-CMKR). The C-CMKR contains encrypted conditional data. In the columns, the C-CMKR contains doubly encrypted key data. If decrypted successfully, as described below, the encrypted conditional data contains the hexadecimal value DEADBEEF and the associated column value for the device key to be used with this C-CMKR. Using its current media key value, the device decrypts conditional data from the encrypted conditional data.

Before continuing to process the Record, the device checks that the following conditions are true: the decrypted conditional data contains the hexadecimal value DEADBEEF and the device has a device key with a newly associated column value (i) decrypted from the conditional data. If any of these conditions is false, the device ignores the rest of the C-CMKR. Otherwise, using the value i from the condition above, the current media key value, and $r=Rd\_i$, $c=Cd\_i$, the device decrypts the doubly encrypted key data at the associated column in the C-CMKR. The device then decrypts the result of the first decryption of the doubly encrypted data using the device's i-th device key. The resulting media key becomes the current media key value.

Verifying the Integrity of a Media Key Block by Storing a Copy of Validation Data in Read-Only Area of Media Referring now to FIG. 1, an exemplary embodiment of a media (10) loaded into a media reader (30) is shown. The media reader (30) reads content (1) from the media (10). If the media (10) includes a writeable area (12), the media reader (30) may also write data to the writeable area (12) of media (10). As described above, the media reader (30) may be any device capable of reading information stored on a media. The media reader (30) includes microprocessors or other circuits to perform the decryptions, calculations and other processing discussed herein. The media (10) may be any media for storing information.

Media (10) includes a read-only area (13) and a media key block (MKB) (11) stored on the media (10). FIG. 1 illustrates the MKB (11) being stored on the writeable area (12) of the media (10). However, the MKB (11) may alternatively be stored on the read-only area (13) of the media (10) without departing from the spirit and scope of the invention.

Parts of the MKB (11) may be encrypted and includes a Verify Media Key Record (15). In one embodiment of the invention, the Verify Media Key Record (VMKR) (15) may also be referred to as "validation data", where the VMKR is encrypted and contains a pre-selected value. It should be noted that some media readers (30) decrypt the validation data (15) during the processing of the MKB (11). In such cases, the present invention does not require an additional read operation over the prior art to retrieve the validation data (15). In another embodiment, validation data may comprise a hash of the MKB (11), to be discussed below.

A copy of the validation data (17) is stored on the read-only area (13) of the media (10). The read-only area (13) may comprise, for example, an embossed data zone or a validation area of a DVD. (An exemplary embodiment in which the validation data (17) is stored in the validation area of the read-only area (13) is described below.) The copy of the validation data (17) is encrypted in the same manner as the validation data (15) is encrypted. Thus, when the copy of the validation data (17) and the validation data (15) are decrypted, the same value should be obtained if no malicious tampering has occurred.

Referring still to FIG. 1, the media reader (30) reads information from the media (10). The information that the media reader (30) reads from the media (10) includes the content (1) (after access is authorized), the MKB (31), the reader validation data (33), and a copy of the reader validation data (35). The media reader (30) decrypts the reader validation data (33), the reader copy of the validation data (35), or both using the media key obtained previously by processing the MKB. If the result of either decryption yields a decrypted value not equal to the preselected value, the media reader (30) refuses to authorize access to the content (1) stored on the media (10). If all of the decrypted values match the preselected value, the media reader (30) continues the authorization process.

It should be noted that the value of a data item as stored on the media (10) and the value of the data item as read by the media reader (30) may differ in an environment in which the content (1) is subject to piracy, direct attacks, man-in-the-middle attacks and other malicious tampering. Therefore, to distinguish between the validation data (15) stored on the media (10) and the validation data (33) read from the media (10) by the media reader (30), the validation data (15) may be referred to as the media validation data (15) and the validation data (33) may be referred to as the reader validation data (33). Similar distinctions can be made between other data items stored on the media (10) and the value of that data item as read by the media reader (30).

The media reader (30) compares the reader validation data (33) and the copy of the reader validation data (35). The comparison may be of either the encrypted values or the decrypted values. Both comparisons may also be made. If the value of the reader validation data (33) and the value of the copy of the reader validation data (35) are equal then the media reader (30) authorizes access to the content (1) stored on the media (10). If these values are not equal, the media reader (30) refuses to authorize access to the content (1) on the media (10).

In one embodiment of the invention, as stated above, the media reader (30) decrypts the reader validation data (33), the reader copy of the validation data (35), or both using the media key obtained previously by processing the MKB. If the result of either decryption yields a decrypted value not equal to the preselected value, the media reader (30) refuses to authorize access to the content (1) stored on the media (10). If all of the decrypted values match the preselected value, the media reader (30) continues the authorization process.

Thus, by comparing the reader validation data (33) and the copy of the reader validation data (35) in conjunction with authorizing access, malicious alteration of the MKB (11) stored in the writable area (12) may be detected. The method of authorizing access to the content used in conjunction with the comparison of the two copies of the validation data may be chosen from those methods well known to the art, including for example decrypting a media key from an MKB. Malicious alteration of either copy of the media validation data (15 or 17) may be detected by the comparison of the encrypted or decrypted values of the copies of the reader validation data (33 and 35).

Figure 2:
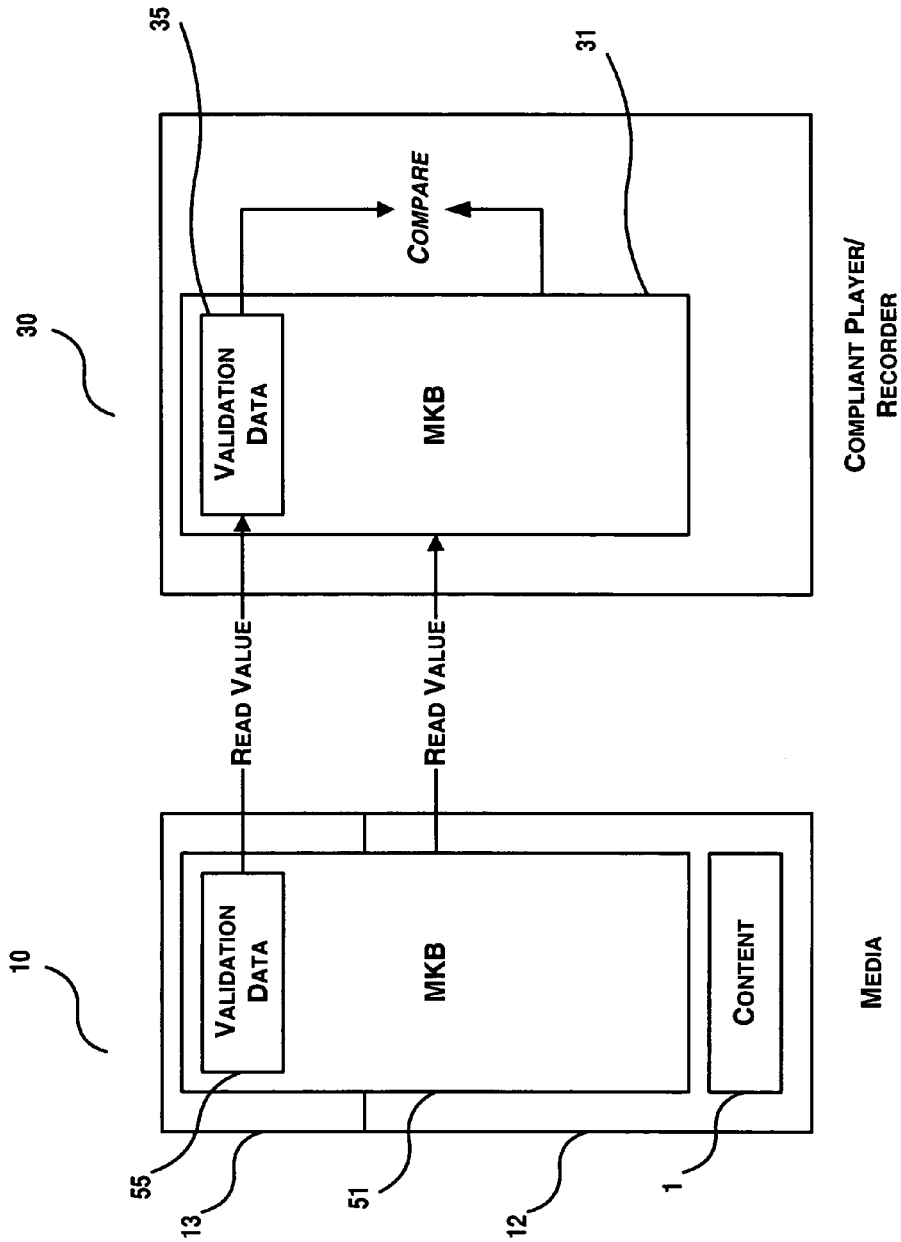
FIG. 2 is a simplified block diagram of another embodiment of the present invention.

Verifying the Integrity of a Media Key Block by Storing Validation Data in a Read-Only Area of Media Referring now to FIG. 2, another exemplary embodiment of a media (10) and a media reader (30) of the present invention is shown. In this embodiment, the MKB (51) is stored on the media (10) so as to straddle the boundary between the read-only area (13) and the writeable area (12), with the media validation data (55) being stored on the read-only area (13). No copy of the validation data is required in this embodiment because the read-only nature of the read-only area (13) of the media (10) protects the validation data from unauthorized tampering.

Figure 3:
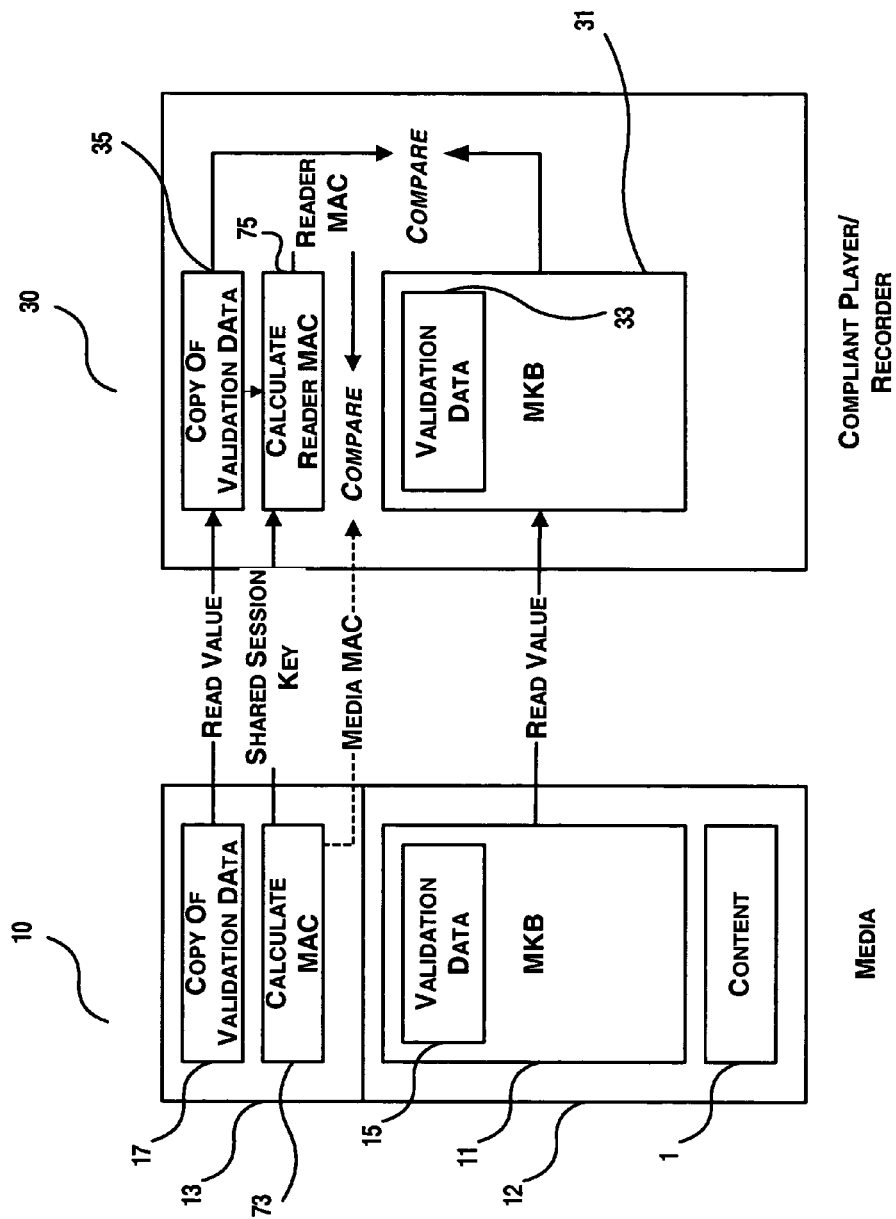
FIG. 3 is a simplified block diagram of another embodiment of the present invention.

Verifying the Integrity of a Media Key Block By Using a Mac Over the Validation Data Referring now to FIG. 3, yet another exemplary embodiment of a media (70) and a media reader (30) of the present invention is shown. In this embodiment, the media (70) includes both the physical media on which the content is stored and a processor or other logic circuit (72). For instance, the media (70) may be a flash memory array including a processor. Another example of a media with a processor is a DVD drive with a CPU to manage the driver. Though, those skilled in the art will recognize that other combinations of media with a processor are obvious. As with other embodiments, the media may also contain a writeable area (12).

Another embodiment of the present invention includes a personal computer having a processor and an input/output device such as a DVD drive. A media (70) having a content (1) stored on it is loaded into the input/output device. Upon sensing the presence of the media (70), or upon user command, the processor attempts to access the content stored on the media (70). Thus, the processor of the personal computer acts as a media reader (30) and the input/output device acts as a media (70). The processor may be configured to process the media validation data (15) and the copy of the media validation data (17), as set forth herein. As will be obvious to those skilled in the art, the combination of a media (70) and a media reader (30) form a system for protecting and accessing the content (1).

A message authentication code may be employed in addition to the validation data discussed previously. To include a message authentication code (MAC) in the present embodiment, the media (70) calculates a media MAC (73) over the copy of the media validation data (17) using a run-time session key established via authentication and key exchange between the media (70) and a media reader (30). In effect, the media (70) electronically signs the media MKB (11) with the media MAC (73).

The media reader (30) reads the media MAC (73) from the media (70). The media reader (30) also reads the copy of the media validation data (17) and calculates a reader MAC (75) over the copy of the reader validation data (35) using the same algorithm as was used to calculate the media MAC (73).

By comparing the reader MAC (75) and the media MAC (73), the media reader (30) makes a second determination of whether authorization for access to the contents (1) of the media (70) should be granted. Should the reader MAC (75) and the media MAC (73) differ, the media reader (30) refuses access to the contents (1) of the media (70). If the two MACs are identical, the media reader (30) allows access to the contents (1) of the media (70). Thus, the media reader (30) checks the electronic signature of the media. The calculation and comparison of the reader and media MACs may occur at any time during the authorization process, including before or after the validation data integrity check is executed.

Thus, a MAC provides another level of protection against man-in-the-middle alterations to the MKB (11). If the man-in-the-middle device alters the copy of the media validation data (17) as the copy of the media validation data (17) is being read from the media (10), the media MAC (73) and the reader MAC (75) will differ.

Figure 4:
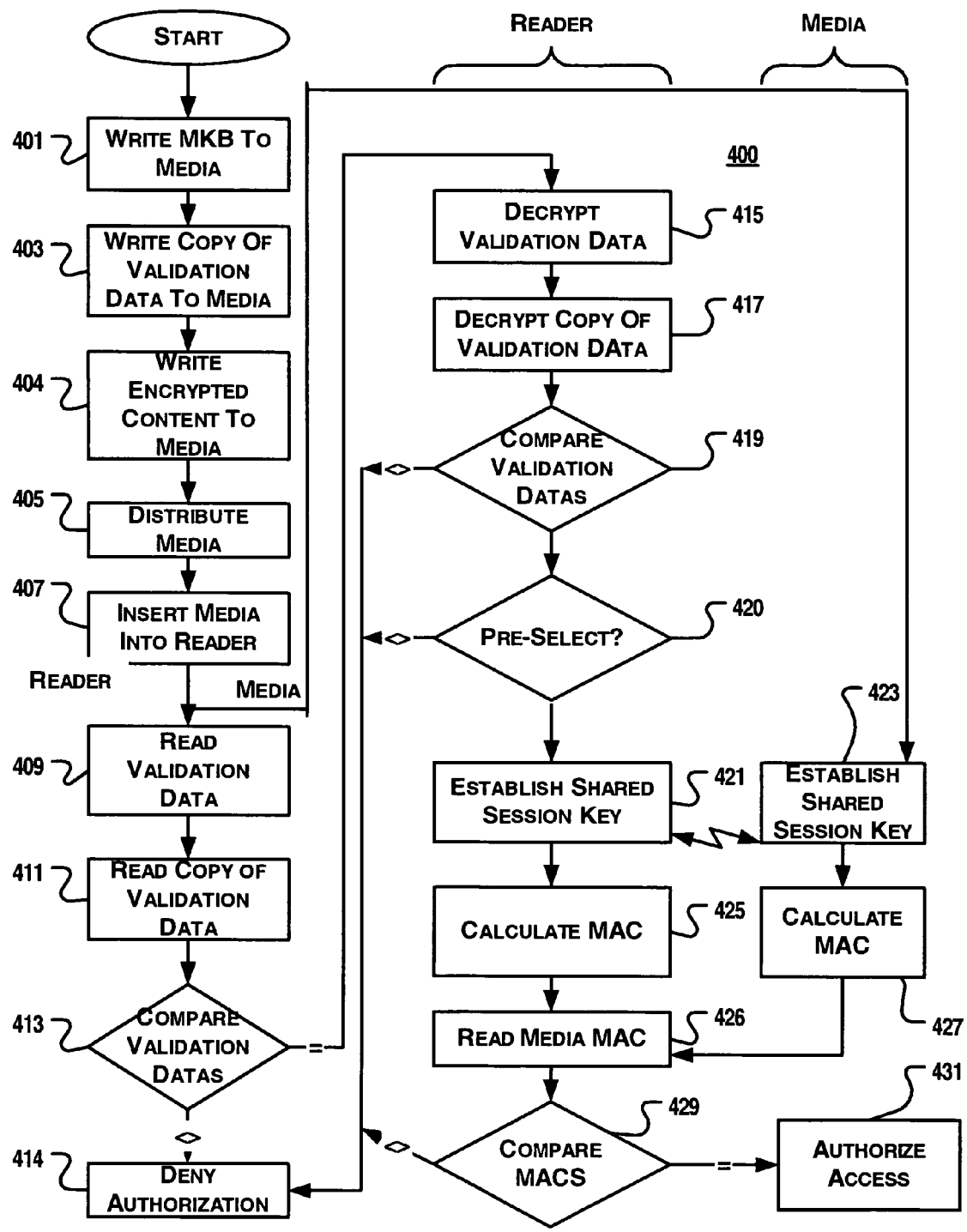
FIG. 4 is a simplified flowchart of a method of the present invention.

Referring now to FIG. 4, an embodiment of a process (400) for authorizing access to content stored on media of the present invention is shown. Before the media is distributed, the MKB including the media validation data is stored on the media (block 401). The media validation data may be stored on the read-only area of the media or it may be stored on the writeable area of the media. If the media validation data is stored on the writeable area then a copy of the media validation data is stored on the read-only area (block 403). In the case of prerecorded media, the content is encrypted in block 404 using the correct media key and then stored on the media before the media is distributed in block 405. In the case of recordable or rewriteable/writeable media, the media is distributed in block 405 and then the content is encrypted in block 404. In block 407 the user inserts the media into a media reader or connects the media and media reader as dictated by the form of media employed.

Upon sensing the presence of the media or upon a command or request from the user or other device, the media reader reads the media MKB including the media validation data from the media in block 409. If a copy of the media validation data has been previously stored on the read-only area of the media, the media reader also reads the copy of the media validation data from the media in block 411.

The media reader may then compare the encrypted value of the reader validation data read from the media with the encrypted value of the copy of the reader validation data read from the media at block 413. If the two values are different the media reader denies authorization to access the content in block 414. Otherwise, the authorization process may continue with block 415.

In blocks 415 and 417, the media reader decrypts the reader validation data read from the media and the copy of the reader validation data read from the media. The media reader may then compare the decrypted values of the reader validation data and of the reader copy of the validation data, as in block 419 using the media key obtained by processing the MKB. If the two values are different the media reader denies authorization to access the content. Otherwise, the authorization process continues with block 420.

In block 420, the media reader compares either the decrypted value of the reader validation data or the decrypted value of the copy of the reader validation data to the pre-selected value. In the alternative, the reader may compare both the decrypted reader validation data and the decrypted copy of the reader validation data to the pre-selected value. If any one of the comparisons fails, then the media reader denies authorization to access the content.

In blocks 421 and 423, the media and media reader establish a shared session key in any manner known to the art. The media reader, in block 425, calculates a reader MAC over a copy of the reader validation data. The media, in block 427, likewise calculates a media MAC over a copy of the media validation data. In blocks 426 and 429, the media reader then reads the media MAC from the media and compares it to the reader MAC. If the two values are different the media reader denies authorization to access the content at block 414. Otherwise, the media reader may authorize access to the content or may process the MKB, as shown in block 431.

Another exemplary embodiment includes processing the MKB to obtain the correct media key; decrypting the validation data with the media key; verifying that the validation data contains the correct preselected value; and comparing the encrypted value of the validation data in the MKB with the encrypted validation data over which a MAC has been successfully calculated by the device and reader.

Another exemplary embodiment includes successfully calculating a MAC over the validation data; decrypting the validation data stored on the read-only area of the media; and verifying that the validation data contains the correct preselected value.

Figure 5:
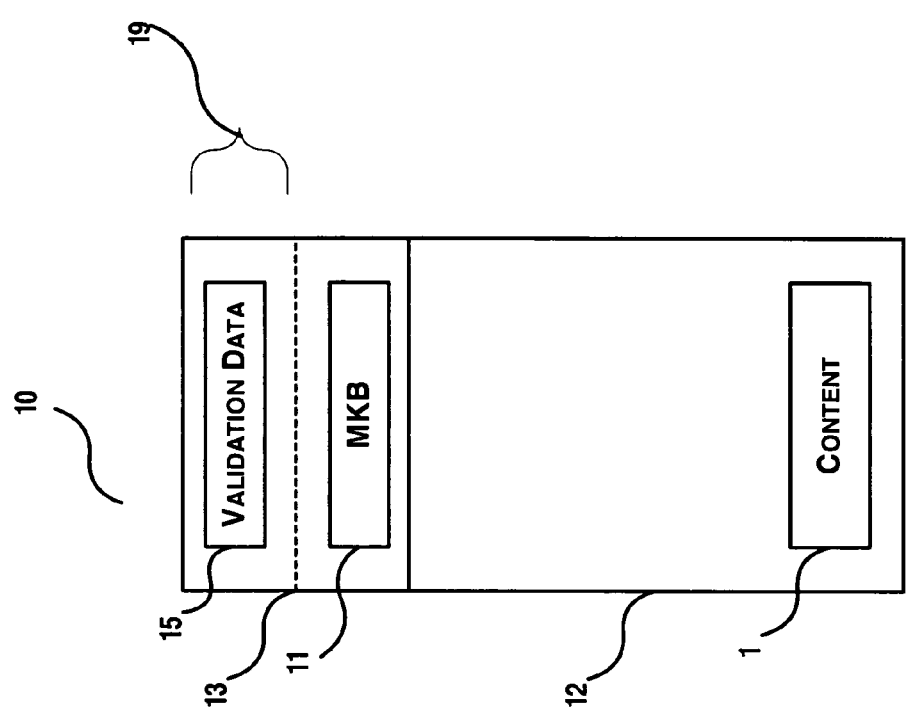
FIG. 5 illustrates an embodiment in which the read-only area comprises a validation area of a medium.

Verifying the Integrity of a Media Key Block By Storing Validation Data in a Validation Area of the Read-Only Area of Media In one exemplary embodiment, as illustrated in FIG. 5, validation data (15) may be stored in a special region of the read-only area (13) called a validation area (19) (also referred to as a VA, or a VA region). A VA region is a portion of certain media types that has physical properties that make it difficult to mimic using ordinary consumer recording equipment/media. A VA region requires special manufacturing equipment to write, making its contents difficult to copy. Furthermore, since the VA is read using a physically different process from that used to read the other areas of a medium, a device can physically distinguish contents written to a VA from contents that may have been written by an ordinary recorder on ordinary recordable media.

It should be understood by one of ordinary skill in the art that the term "VA" or "VA region" is to be construed as an area having the general properties described herein, and that the term "VA" or "VA region" shall not preclude other areas having the properties of a VA described herein from being construed as an equivalent of a VA.

Examples of VAs include a burst cutting area (BCA) of a DVD-ROM (Digital Versatile Disc-Read-Only Memory) and a DVD-RAM (Digital Versatile Disc-Random Access Memory); and a narrow burst cutting area (NBCA) of a DVD-R (Digital Versatile Disc-Recordable) and DVD-R/W (Digital Versatile Disc-Rewriteable). (DVD-Rs and DVD-RWs shall together be referred to as DVD-R/Ws.)

Although the MKB is shown to reside on a read-only area (13) of the media in FIG. 5, the read-only area (13) may not always be a truly read-only region. For instance, in the case of DVD-R and DVD-RW recordable media, the read-only area (e.g., the Control Data Area) is not truly read-only for various technical reasons beyond the scope of this invention. As a result, information placed there may be susceptible to direct alteration on the media.

Validation data may comprise the Verification Data field of the Verify Media Key Record, as discussed above. In other embodiments, validation data may additionally or alternatively comprise a hash function on the MKB, also known as the MKB_Hash.

Validation Data Comprising MKB_Hash

Validation data may comprise MKB_Hash. This can, for example, help to maintain compatibility with DVD-RAMs, where MKB_Hash is stored in a CDA of a DVD-RAMs read-only area in a PC based system having a drive-host configuration where CPRM content protection is used. In such a system, a DVD drive and PC host act together as a recording device and/or playback device for CPRM protected content. In a drive-host configuration, the host verifies the integrity of the MKB it receives from the drive. It does this by using a message authentication code (MAC) calculation algorithm.

Figure 6:
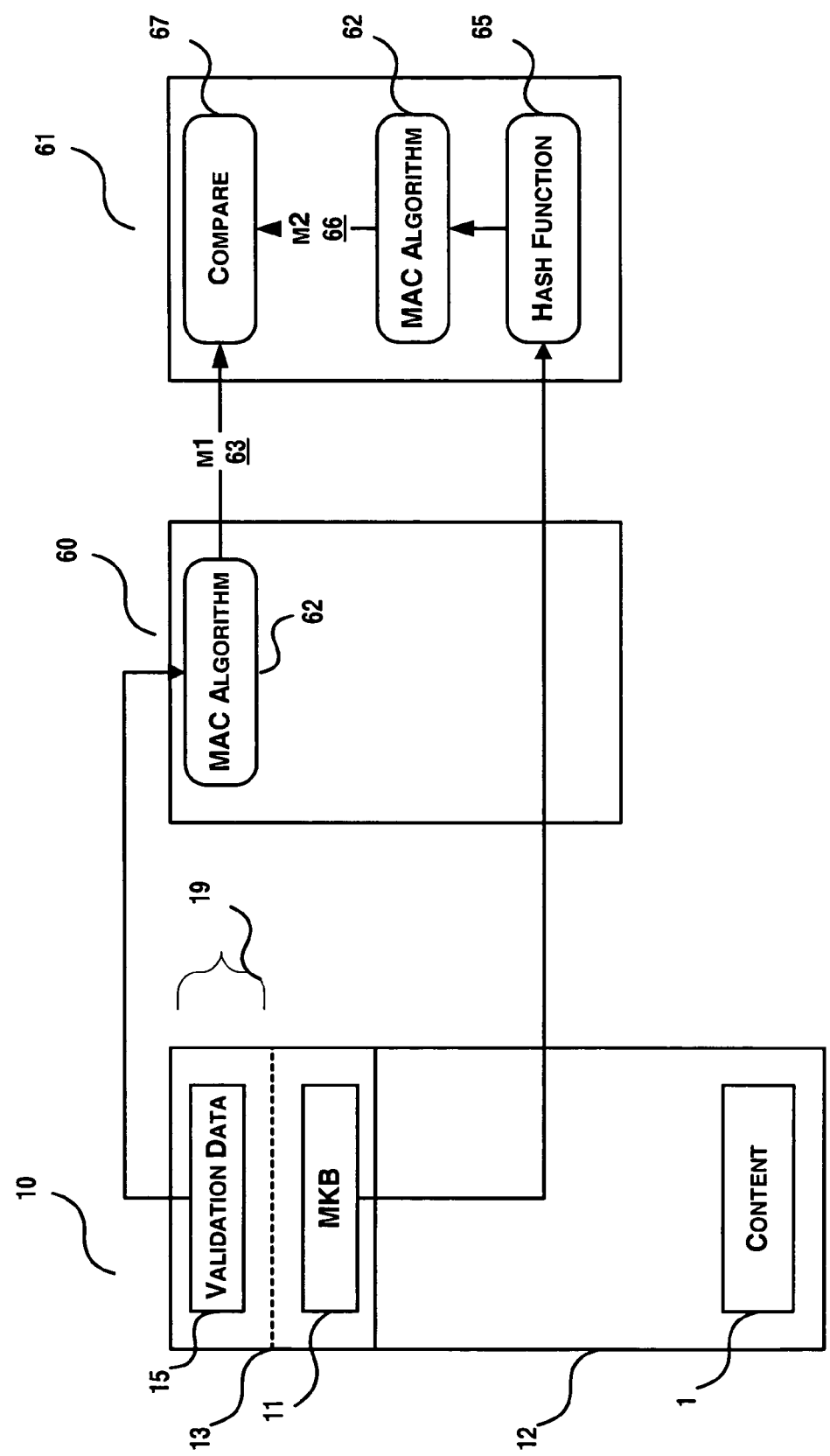
FIG. 6 illustrates one exemplary system which utilizes the validation area of a medium to validate data.

In DVD-R/W formats, for instance, the manufacturer calculates MKB_Hash, and stores the result in the NBCA. For example, MKB_Hash may be calculated as C2_H (MKB), where C2_H is a hashing procedure based on a C2 encryption algorithm used in CPRM technology, and where MKB includes the entire MKB Frame minus the MKB Descriptor. In a drive-host configuration, validation data comprises MKB_Hash, which is used to verify the integrity of the MKB on both a DVD-RAM and a DVD-R/W, as illustrated in FIG. 6. Generally, MKB_Hash stored in the validation area may be used to detect direct alteration of the MKB. Thus, the drive reads the MKB_Hash, the host reads the MKB and calculates a hash, and if the two hash values match, the MKB is authenticated.

To guard against man-in-the-middle attacks, a MAC calculation algorithm may be further used as follows. Upon request from the host (61), the drive (60) requests the first MKB Pack (MKB Pack #0) from a DVD-R/W, and reads an MKB_Hash (15) from the NBCA (19). Using a MAC calculation algorithm (62), a drive MAC, m1 (63), is calculated over the MKB_Hash (15) value, and part of the MKB Descriptor of MKB Pack #0 is replaced with m1 (63). The modified MKB Descriptor is then returned to the host (61). If there are more MKB Packs available, the host (61) reads them from the drive (60). Then, using the MKB and any unused (zero-valued) bytes that follow it in the MKB Frame, the host (61) calculates a value, h, as:

$$h = C2\_H(MKB \text{ and trailing zeros}),$$

where C2_H (65) represents the hash function used to calculate MKB_Hash (15).

Using the resulting h value, the host then uses the MAC algorithm (62) to calculate a host MAC, m2 (66) as:

$$m2 = DVD\text{-}MAC(h).$$

A compare function (67) of the host (61) verifies the integrity of the received MKB (11) by determining if m1=m2. If verification fails, then the host (61) aborts the playback or recording session in progress. Otherwise, it calculates a media unique key ($K_{mu}$). Note that whether the host (61) verifies the MKB's (13) integrity before or after the calculation of the media key ($K_m$) is implementation-defined.

Figure 7:
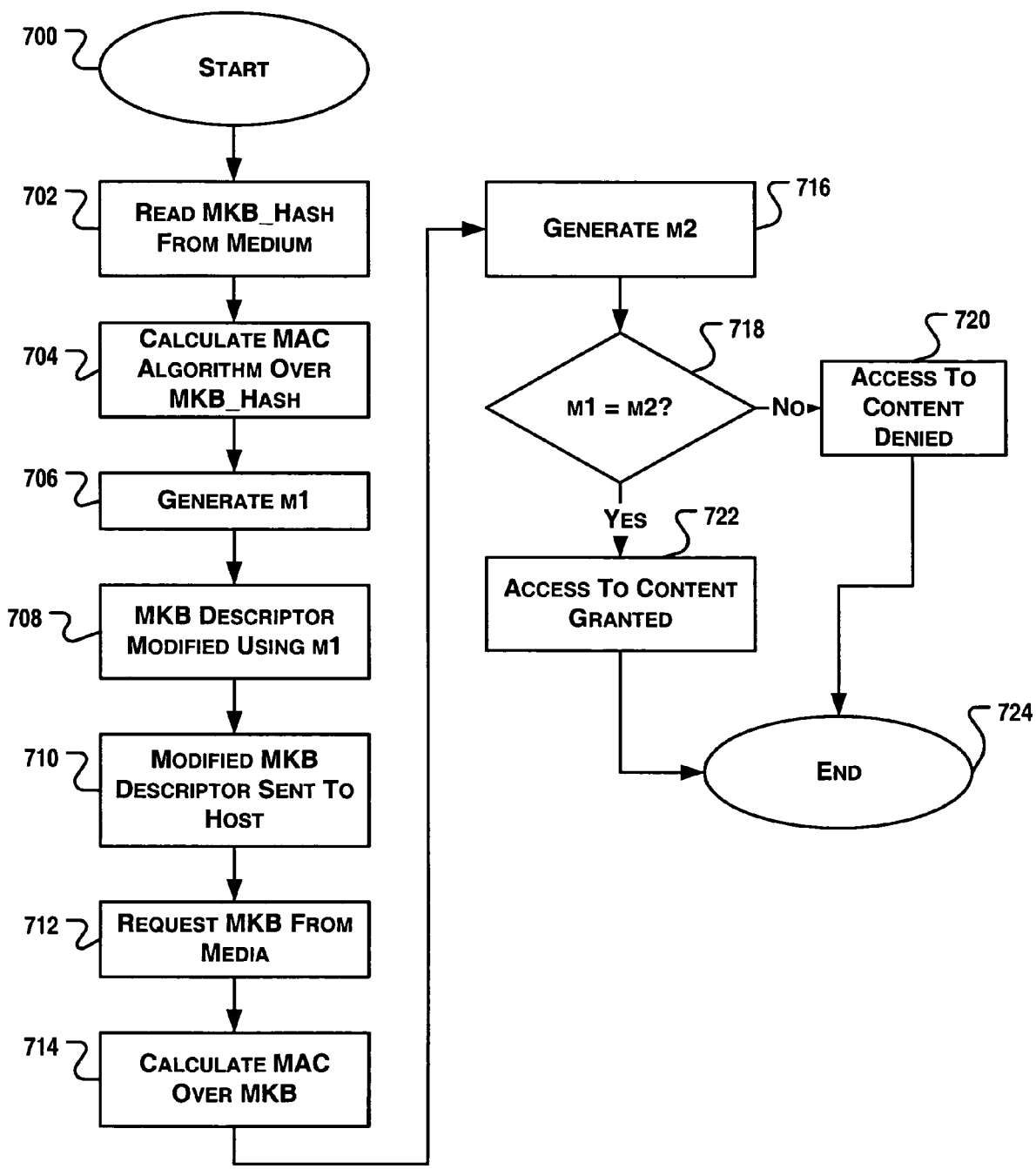
FIG. 7 illustrates a method of FIG. 6.

A method for MKB validation in a drive-host configuration is shown in FIG. 7, starting at block 700. At block 702, the drive reads the MKB_Hash from the media, and calculates a MAC algorithm over the MKB_Hash at block 704. A drive MAC, m1, is generated at block 706, and parts of the MKB Descriptor of the MKB are replaced at block 708. The modified MKB Descriptor is sent to the host at block 710. The host then requests the MKB from the media at block 712, calculates the hash of the MKB at block 713, and then calculates the MAC algorithm over the MKB hash at block 714. At block 716, a host MAC, m2, is generated at block 716. At block 718, m1 is compared to m2, and access is denied at block 720 if m1 does not equal m2, or granted at block 722 if m1 equals m2. The method ends at block 724.

Validation Data Comprising the
Verification Data Field

Validation data may comprise the Verification Data field of the Verify Media Key Record, supra.

Figure 8:
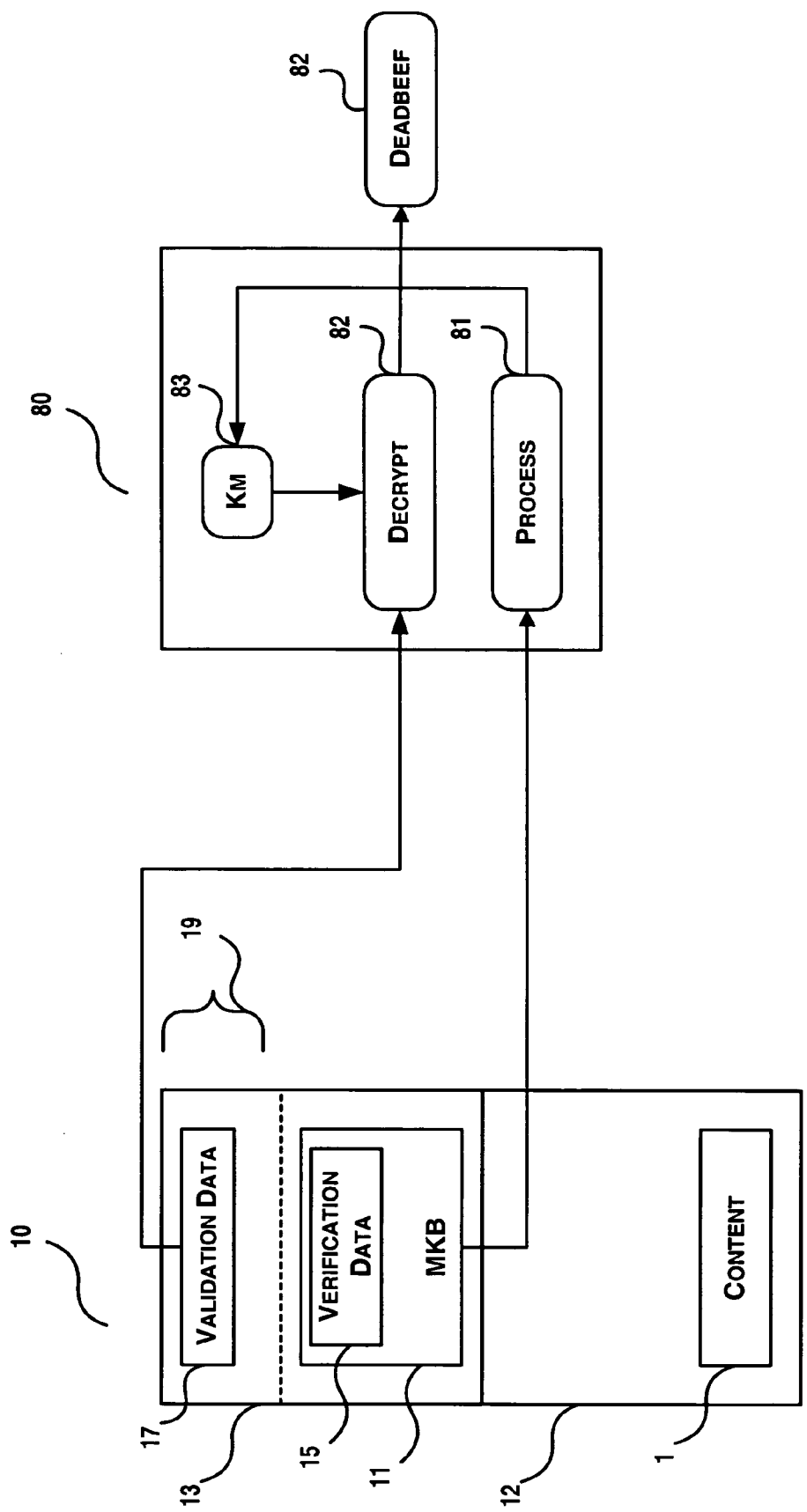
FIG. 8 illustrates another exemplary system which utilizes the validation area of a medium to validate data.

To implement this, a copy of the Verification Data field of the MKB's Verify Media Key record is stored in the NBCA. As shown in FIG. 8, a CE device (80) authenticates the MKB (11) on a DVD-R/W by processing (81) the MKB (11) from the DVD-R/W disc, as described above. The CE device (80) uses the resulting Media Key ($K_m$) (83) to decrypt (82) the copy of the Verification Data field (17) stored in the NBCA of the DVD-R/W, ensuring that it decrypts to the hexadecimal value DEADBEEF (84) before proceeding. In this manner, direct attacks may be thwarted in either a CE or a drive/host configuration.

Figure 9:
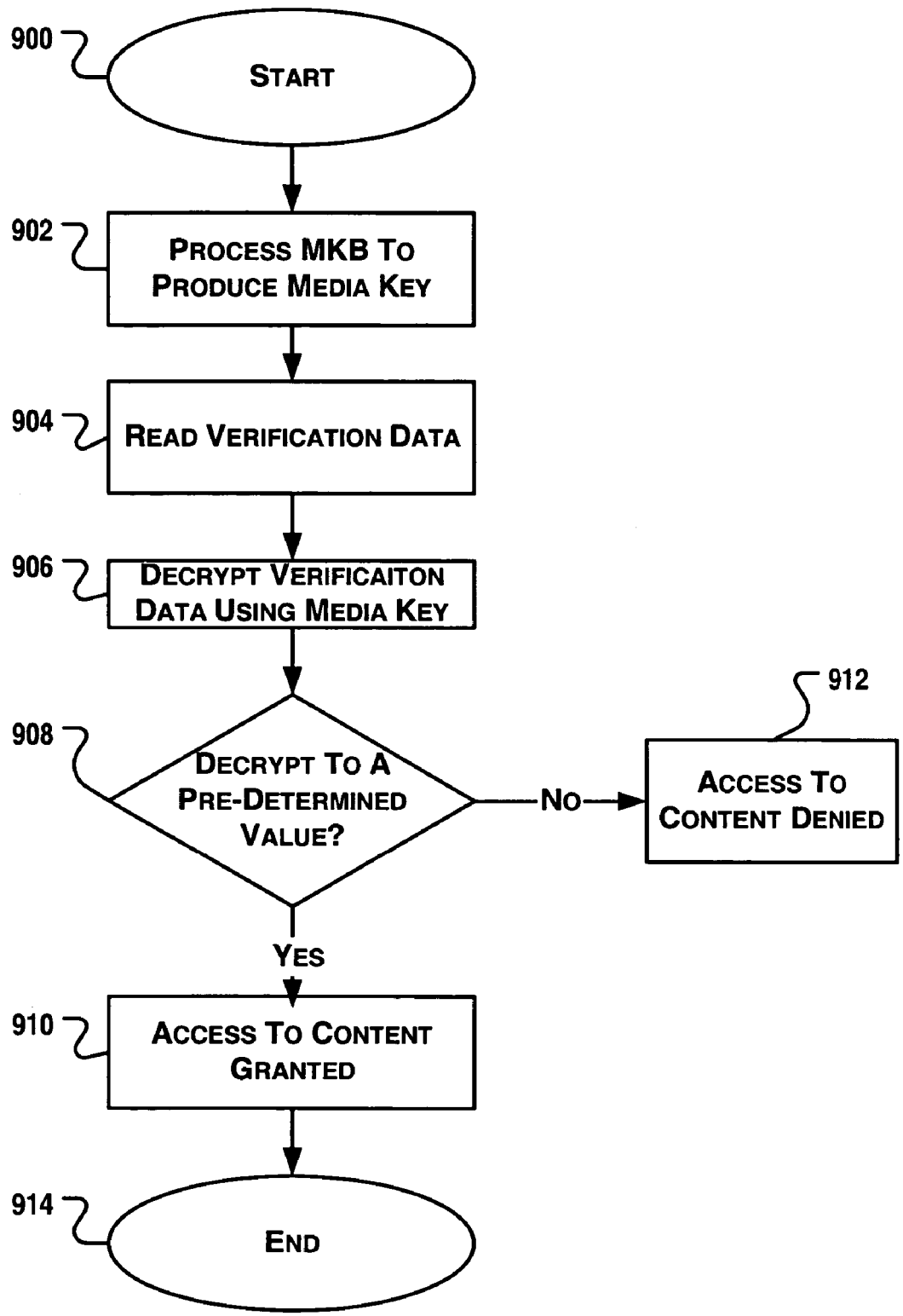
FIG. 9 illustrates a method of FIG. 8.

A method for MKB validation in a CE device is shown in FIG. 9, starting at block 900. At block 902, the MKB is processed to produce a media key. The CE device then reads the validation data at block 904. Using the media key, a decryptor decrypts the validation data at block 906. If the validation data decrypts to a pre-determined value (i.e., hexadecimal value for DEADBEEF) as checked at block 908, then the CE device grants access to the contents at block 910. Otherwise, the CE device denies access to the contents at block 912. The method ends at block 914.

To guard against man-in-the-middle attacks in a drive/host configuration, a MAC may be calculated over the validation data in a manner similar to the method described above for calculating a MAC over an MKB hash.

Maintaining Compatibility With DVD-RAMs

In an exemplary embodiment, full compatibility between DVD-RAMs and DVD-R/Ws, for example, is achieved from the perspective of a host within a drive-host configuration. Thus, both an MKB_Hash and Verification Data are stored in the NBCA of DVD-R/Ws. By storing both types of validation data in the validation area of a disc, the integrity of an MKB may be verified on both DVD-RAMs and DVD-R/RWs with little or no modification to media readers.

By placing the MKB_Hash (15) in the VA (19) of a medium, compatibility with currently existing media types using MKB_Hash (15) to validate MKBs (11) can be maintained. The device is merely subject to a minor adjustment for determining whether to read the MKB_Hash from the control data area (CDA) of a DVD-RAM or to read the MKB_Hash from the NBCA of a DVD-R/RW. The drive interface command and returned data are the same for DVD-R/W and DVD-RAM, and the host verifies the authenticity of the MKB using the identical procedures previously defined by the CPRM specification.

Conclusion

Thus, embodiments of the invention provide a robust means of validating a media key block to protect content, such as CPRM content on DVD-R/W media, against unauthorized copying. The enhanced protection is enabled by new discs and new devices that use the invention. At the same time, full interoperability among new and old devices, and new and old media is maintained with little or no modifications to media readers.

By storing validation data in the validation area of a read-only region, direct attacks may be thwarted since the validation data cannot be altered. By adding a MAC calculation over the validation data, man-in-the-middle attacks may be thwarted as well.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, while exemplary embodiments have been described, it should be understood by one of ordinary skill in the art that concepts of this invention can be applied to other types of content, content protection systems, and media formats. For example, while the exemplary embodiments described herein are specific to DVD media as they relate to a current form of protection (i.e. CPRM), one of ordinary skill in the art would understand that other forms of protection currently existing or to be developed in the future may apply as well.

Furthermore, while embodiments of the invention described herein refer to an area called the validation area, it should be understood that the validation area is an area having characteristics described herein, and that such an area is not limited to areas that are called, or that contain the term, validation area. As an example, DVD-ROMs and DVD-RAMs comprise a validation area called a burst cutting area, while DVD-Rs and DVD-RWs comprise a validation area called a narrow burst cutting area.

What is claimed is:

1. A method, comprising:
    reading a media key block from a medium, the medium having content and validation data that includes a validation value;
    generating a media key from the media key block;
    reading the validation data;
    decrypting the validation data using the media key; and
    granting access to the content if the validation data decrypts to the validation value.

2. The method of claim 1, wherein said reading the validation data comprises reading a copy of the validation data from a read-only area of the medium.

3. The method of claim 1, wherein said reading the validation data comprises reading the validation data from a read only area of the medium.

4. The method of claim 3, wherein the validation data comprises a hash value based on the media key block.

5. The method of claim 4, wherein the hash value is stored in a validation area of the medium.

6. The method of claim 1, wherein the validation data comprises a verification data field of a verify media key record of the media key block.

7. A system comprising:
   a drive to:
      read a hash value from a validation area of a medium having content;
      read a media key block from the medium;
      calculate a MAC (message authentication code) over the hash value to generate a drive MAC value; and
      generate a second hash value based on the media key block; and a host to:
      calculate a hash function over the media key block;
      calculate the MAC over the second hash value to generate a host MAC value;
      compare the drive MAC value to the host MAC value; and grant access to the content if the drive MAC value equals the host MAC value.

8. The system of claim 7, wherein the medium comprises a DVD-RAM (Digital Versatile Disc-Random Access Memory), and the hash value is stored in a control data area of the DVD-RAM.

9. An apparatus comprising:
   a device to:
      read a medium having content, a media key block, and a copy of the verification data corresponding to a verification data field of the media key block, the verification data field being associated with a predetermined value;
      process the media key block to generate a media key;
      decrypt the copy of the verification data using the media key; and
      grant access to the content if the copy of the verification data decrypts to the predetermined value.

10. The apparatus of claim 9, wherein the medium comprises a DVD-R/W (Digital Versatile Disc-Rewriteable), and the copy of the verification data is stored in a narrow burst cutting area of the DVD-R/W.

11. The apparatus of claim 10, wherein the medium additionally comprises a hash value based on the media key block, the hash value being stored in the narrow burst cutting area of the DVD-R/W.

* * * * *